United States Patent

Nilsson et al.

(10) Patent No.: US 6,625,670 B1
(45) Date of Patent: Sep. 23, 2003

(54) NETWORK INTERFACE CARD ASYNCHRONOUS INTERFACE WITH SIGNALLING LINES AND AT LEAST EIGHT DATA LINES FOR SWITCHING BETWEEN FORWARD CHANNEL AND REVERSE CHANNEL

(75) Inventors: Anders Nilsson, Dalby (SE); Teodor Iancu, Malmö (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 09/255,914

(22) Filed: Feb. 23, 1999

(30) Foreign Application Priority Data

Feb. 17, 1999 (SE) .............................................. 9900517

(51) Int. Cl.[7] .............................................. G06F 13/00
(52) U.S. Cl. .................. 710/31; 709/220; 709/222; 709/223; 709/250; 710/8; 710/10; 710/15; 710/33; 710/100; 710/301
(58) Field of Search .................... 709/220, 222, 709/223, 250; 710/8, 10, 15, 31, 33, 301, 100

(56) References Cited

U.S. PATENT DOCUMENTS

| | | | |
|---|---|---|---|
| 5,339,395 A | | 8/1994 | Pickett et al. ............... 710/305 |
| 5,446,915 A | * | 8/1995 | Pierce .......................... 712/11 |
| 5,509,124 A | | 4/1996 | Bourke et al. .............. 710/100 |
| 5,666,558 A | | 9/1997 | Pipkins ........................ 710/31 |
| 6,006,284 A | * | 12/1999 | Cockroft ...................... 710/14 |
| 6,256,684 B1 | * | 7/2001 | Klein ............................. 710/35 |
| 6,275,874 B1 | * | 8/2001 | Wilson .......................... 710/8 |
| 6,477,567 B1 | * | 11/2002 | Ohara ......................... 709/223 |

FOREIGN PATENT DOCUMENTS

EP 0 579 515 A1 1/1994 ........... G06F/13/42

OTHER PUBLICATIONS

The IBM Ethernet Adapter; "http://publib.boulder.ibm.com:80cgi-bin/bookmgr/BOOKS/BK8R0000/1.1".

* cited by examiner

*Primary Examiner*—Jeffrey Gaffin
*Assistant Examiner*—Tammara Peyton
(74) *Attorney, Agent, or Firm*—IP Creators; Charles C. Cary

(57) ABSTRACT

The present invention relates to an asynchronous interface for communication between two devices. It comprises signalling lines and at least eight data lines and is especially suitable for connections over short distances the interface provides a signal ground line, power supply line, power supply ground line and seven signalling lines between the two devices. The present invention also presents a method for communication by an asynchronous interface. The method comprises a procedure for changing the transmission direction from a forward direction to a reverse direction, a procedure for transmitting data in the reverse direction and a procedure for changing back the transmission direction to the forward direction from the reverse direction.

15 Claims, 5 Drawing Sheets

NETWORK INTERFACE CARD ASYNCHRONOUS INTERFACE WITH SIGNALLING LINES AND AT LEAST EIGHT DATA LINES FOR SWITCHING BETWEEN FORWARD CHANNEL AND REVERSE CHANNEL

The present invention relates to an interface for communication between a first device and a second device comprising signalling lines and at least eight data lines.

The invention also relates to a method for communication over such an interface.

BACKGROUND OF THE INVENTION

A number of interfaces for communication between two devices are known.

One example of such an interface is the Universal Serial Bus (USB), which is a serial cable bus that supports data exchange between a host computer and a wide range of simultaneously accessible peripherals. The peripherals attached to the USE share USB bandwidth through a host-scheduled token-based protocol. For example the USB is used to connect a PC, acting as host, to a keyboard, a mouse, a monitor, a speaker, a printer etc., via connection boxes, referred to as hubs, in a variety of constellations.

Another example is Fire Wire, IEEE P1394 High Performance Serial Bus, which is a serial bus supporting both backplane busses and cable. This system supports up to 16 connections simultaneously.

Yet another example is the SCSI standard which is a parallel asynchronous peer-to-peer I/O bus connecting up to 16 SCSI devices. The purpose of the SCSI bus is to connect multiple devices to one or more computers and getting a high throughput of data, even if the devices are connected by a 6 m or a 25 m cable. For the purpose of connecting multiple devices the devices are daisy-chained together by a cable with at least 50-lines. To manage the communication with different units the system is using addresses corresponding to identities of the different units.

Another example is a parallel port according to IEEE 1284, which generally is used to connect an external peripheral device to a computer via a cable. A parallel port has been used for communication between computers and peripheral devices for a long time, and therefore many computers and peripheral devices in use today are using it to communicate with each other. New and better protocols and schemes for communication is developed all the time and the parallel port is no exception. The fact that there are old devices utilising the parallel port results in a problem regarding whether to let all parallel ports be compatible with each other or to make the port better. This problem is solved by making a new parallel port be compatible with all prior ports and by making two connected ports negotiate regarding what scheme to use in the communication. As mentioned above the parallel port is designed to communicate via a cable. To give the user greater freedom in choosing where to place the two connected devices in relation to each other the parallel port is designed to be able to communicate via a 17 m cable. This results in advantages, for example, a scanner and a computer do not have to share the small amount of free space on a crowded desk and a noisy printer do not have to be placed in the same room as persons using it to print.

The use of the SCSI standard system or the parallel port for connections over short distances would however make the solution expensive and complex. Further, such a solution would have rather large energy consumption and it would require much space. In respect of a solution with the parallel port it would result in some interface functions being too slow.

Yet another example is the PCI Local Bus, which is a synchronous addressable bus interface. The bus is intended for use as an interconnect mechanism between highly integrated peripheral controller components, peripheral add-in boards, and processor memory systems. The purpose of the bus is to solve the bottleneck problem between a processor and a display peripheral in a graphics-oriented operating system. This is achieved by moving peripheral functions with high bandwidth requirements closer to the processor of a system.

A solution for connection between only two devices using the PCI Local Bus would be unsuitably complex, and thereby too expensive, and would require much space.

SUMMARY OF THE INVENTION

The object of the present invention is to provide a new interface for a connection between a first device, e.g. a peripheral device, and a second device, e.g. a network interface card, which interface is especially suitable for connections over short distances. This is attained by an asynchronous interface for communication between a first and a second device, comprising signalling lines and at least eight data lines. The asynchronous interface is characterised by:

a signal ground line, a power supply line and a power supply ground line between the two devices, and only seven signalling lines between the two devices, the seven signalling lines being NICClk, which provides an output from the first device for handshaking when data is transferred in a forward direction, PrntClk, which provides an output from the second device for handshaking when data is transferred in the forward direction and a reverse direction respectively, NICAck, which provides an output from the first device for handshaking when data is transferred in the reverse direction, NICBUsReq, which provides an output from the first device for indicating that it is ready for a change in transfer direction and as a request to the second device to complete the change of transfer direction immediately, PrntBusAck, which provides an output from the second device for acknowledging a change of transfer direction, i.e. from forward to reverse or reverse to forward, NICInt, which provides an output from the second device for requesting data transfer in the reverse direction and for requesting, when the transfer in the reverse direction is finished, the interface to return to a normal mode, Prntint, which provides an output from the first device for requesting the interface to be reinitialised.

The lesser number of signalling lines according to the inventive solution, relatively to the prior art parallel interfaces, results in a more simple construction of the interface. By making the signalling lines carry signals according to the invention a relatively fast interface is provided. By the provision of precisely seven signalling lines carrying signals according to the inventive solution, an optimised balance between the signalling rate and the simplicity of the interface is achieved. In addition, these features provide a small and cheap interface and as a result thereof less number of components are needed for the implementation.

In a further advantageous embodiment the devices comprise signal drivers to handle the communication via the interface, which are capable of sinking at most 8 mA and of sourcing at most 8 mA. This embodiment provides the advantage of making it possible to use more cost-effective components.

The object of the present invention is also attained by a method for communication by an asynchronous interface, which comprises the steps of;

the first and the second device being in a normal mode where data transmission from the first to the second device is possible, i.e. data is transmitted or the interface is waiting for data to be transmitted, and the second device intends to transmit data to the first device, the second device altering an output NICInt from a first state to a second state, to inform the first device that it has data to transmit and to request a change in transfer direction from a forward direction to a reverse direction, the first device subsequently altering an output, NICBusReq, from a first state to a second state when it has no more data to transmit, to inform the second device that it is idle and ready to receive data and to request the second device to complete the change of transfer direction, the second device responding to this by altering an output PrntBusAck from a first state to a second state as an acknowledgement to the output NICBusReq of the first device and to acknowledge that the change of transfer direction is completed, the second device subsequently making data, which it intends to send, available to the first device on data lines and sequentially to that altering an output PrntClk from a first state to a second state, to inform the first device that data is available, the first device altering an output NICAck from a first state to a second state, to acknowledge that it has noticed that data is available, the second device subsequently altering the output PrntClk from the second state to the first state, to acknowledge that it has noticed the change of state of the output NICAck, the first device subsequently altering the output NICAck from the first state to the second state, to acknowledge that data is received and that it is ready to receive new data, possible further data transmissions being conducted in the same manner as mentioned above until the second device has no further data to transmit, after which it alters the output NICInt from the first state to the second state, to inform the first device that it has concluded its transmission, the first device altering the output NICtusReq from the second state to the first state in response to the output NICInt of the second device, to indicate that it is prepared to operate as a transmitter and to request the second device to complete the change of transmitting direction, the second device acknowledging this by altering the output PrntBusAck from the second state to the first state, to inform the first device that it is prepared to operate as a receiver and to finally return the interface to the normal mode.

This method enables a fast change in transmission directions, i.e. from transmission in a forward direction to transmission in a reverse direction and vice versa.

In another aspect of the invention the method further comprises comprising the steps of the first device setting its outputs in the second state at initialisation and reinitialisation, the first device altering its outputs from the second state to the first state, which is the state of these outputs in normal mode, when it has finished initialisation, the second device setting its outputs in the second state at initialisation and reinitialisation, the first device altering its outputs from the second state to the first state, which is the state of these outputs in normal mode, when it has finished initialisation, the interface not allowing data transmission until both the outputs of the first device and the outputs of the second device are in the first state, i.e. the interface is in normal mode.

This aspect of the invention has an advantage of being a simple method for initialisation of the interface and completes the initialisation within a short time interval. The short time interval of the initialisation procedure is a result of a minimum of communication over the interface.

Within the context of the invention a peripheral device is a device for data storage, external communication or other tasks in a computer system. A peripheral device is for example a printer, a modem, a scanner, a fax machine, a photocopier or a multifunction peripheral.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF A PREFERRED EMBODIMENT

Figure 1:
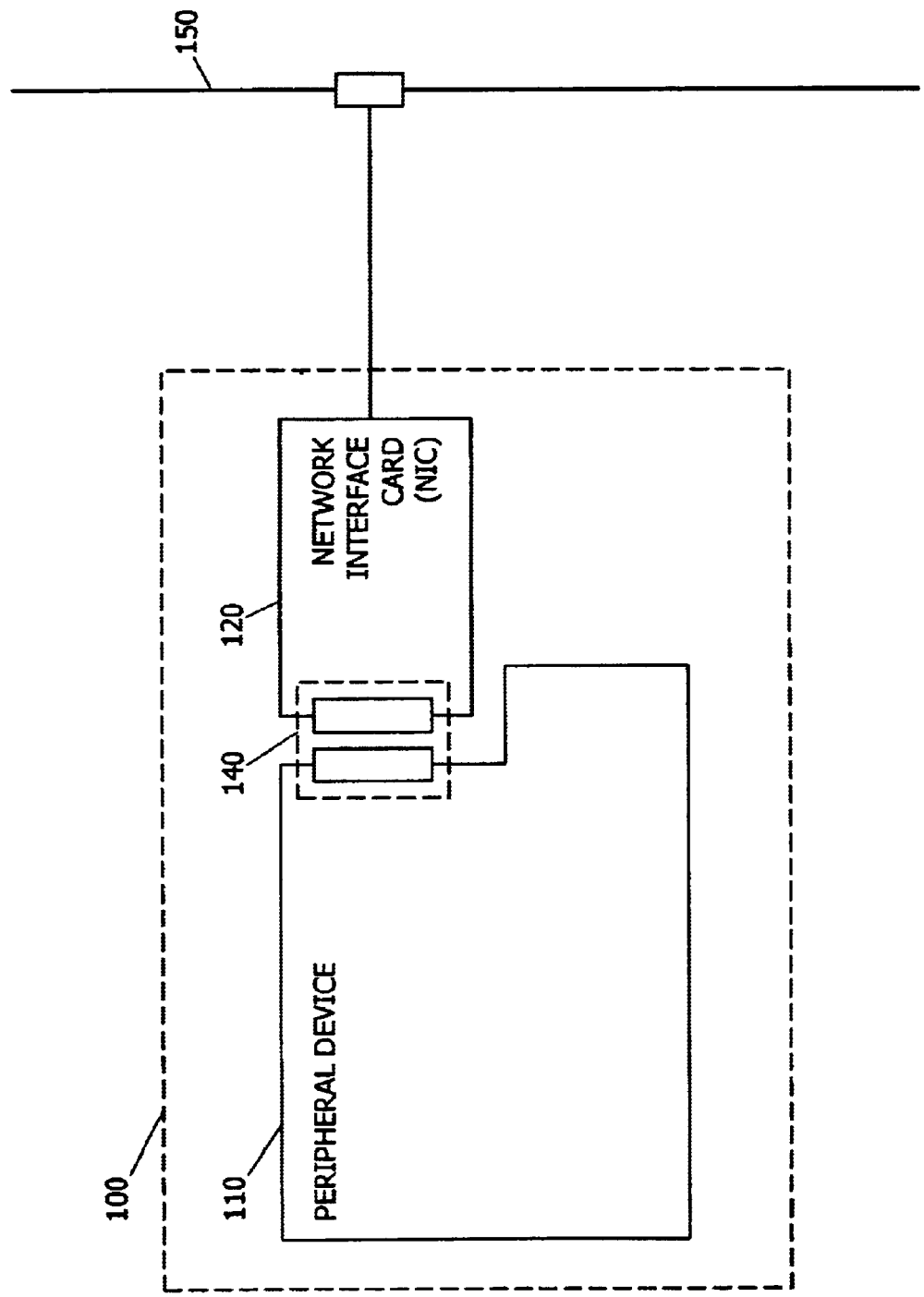
FIG. 1 is a schematic view of the interface in a possible environment.

Referring to FIG. 1, an interface 140 for communication between a peripheral device 110 and a network interface card 120 (NIC) is provided. The purpose of the NIC 120 is to connect the peripheral device 110 to a network 150. In a preferred embodiment of the invention the NIC 120 is mounted inside the case 100 of the peripheral device.

Figure 2:
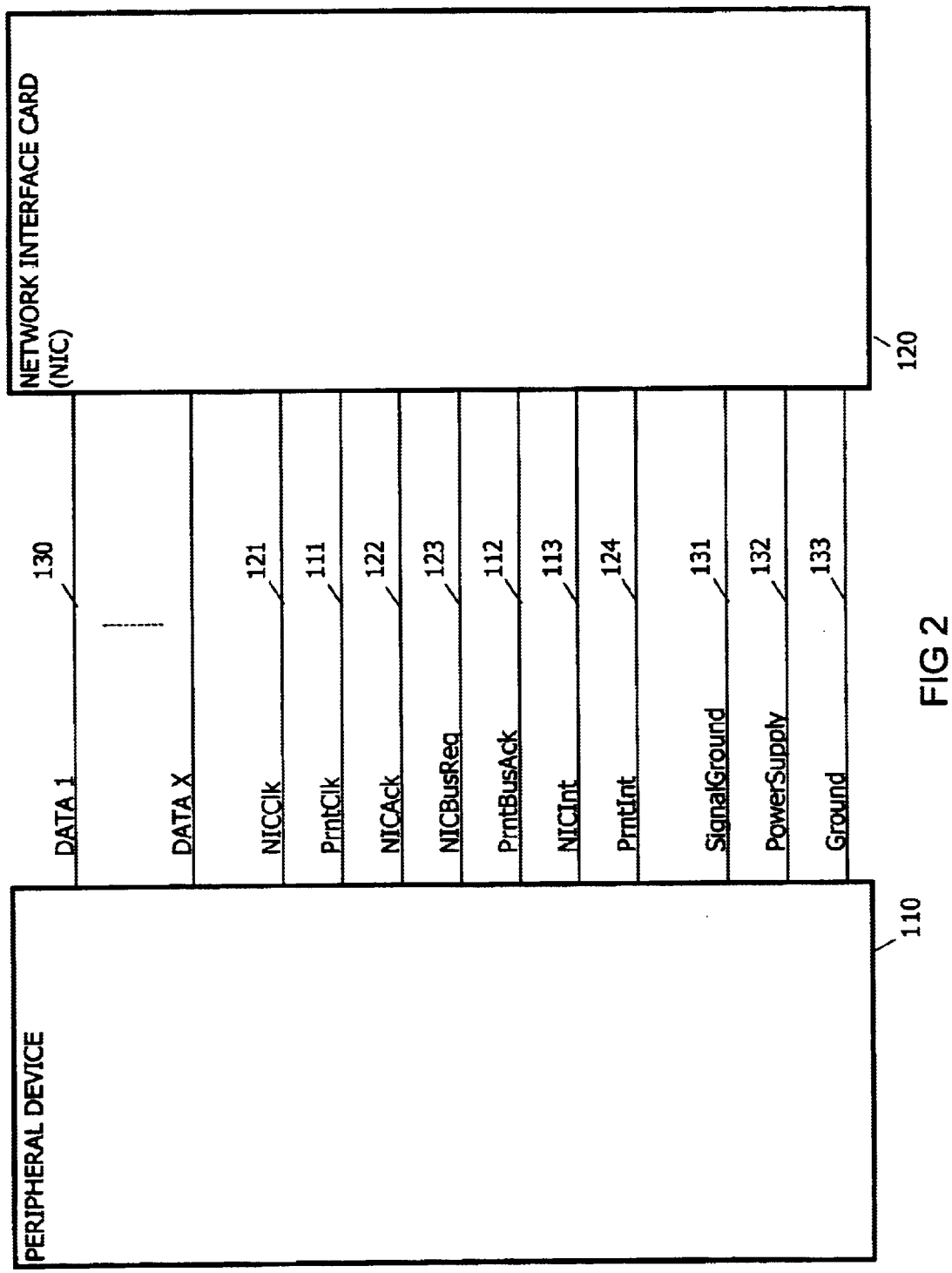
FIG. 2 is a schematic view of an interface.

Referring to FIG. 2, the peripheral device 110 and the NIC 120 are connected to each other by X data lines, where X is e.g. 8 or 16, for bi-directional data transfer.

Further, they are connected to each other by seven signalling lines. Four of these signalling lines, NICClk, NICAck, NICBuskeq and PrntInt, are outputs from the NIC 120. NICClk 121 is used for handshaking during data transfer in a forward direction, i.e. data transfer from the NIC 120 to the peripheral device 110. NICAck 122 is used for handshaking during data transfer in a reverse direction, i.e. data transfer from the peripheral device 110 to the NIC 120. NICBusReq 123 is used for acknowledging that the NIC 120 is ready for a change in data transfer direction, i.e. from forward direction to reverse direction and vice versa. PrntInt 124 is used for interrupt-signalling and to reinitialise signalling.

The other three signalling lines, PrntClk, PrntBusAck and NICInt are outputs from the peripheral device 110. PrntClk 111 is used for handshaking during data transfer in both the forward direction and the reverse direction. PrntBusAck 112 is used for acknowledging a change in the direction of data transfer. NICInt 113 is used for interrupt-signalling, and to request a change of transfer direction from forward to reverse direction and vice versa.

In one preferred embodiment, the signalling drivers for the signalling lines are of a type that is not able to sink more than 8 mA and to source more than 8 mA. In another preferred embodiment, the signalling drivers are constructed to sink and to source 4 mA.

Lines for signal ground, power supply and ground are also provided. The power is supplied from the peripheral device 110 to the NIC 120 and is preferably 3.3 V/1.2 A but the NIC 120 could be able to use a 5.0 V/0.75 A power supply if it is required.

The connection between the peripheral device 110 and the NIC 120 could be of any type that is practical to use for connection of two devices positioned at a short distance from each other. It is possible to implement the NIC 120 on the same printed circuit card, in which case the lines are in the form of printed circuits. Another possibility is to mount a connection member on one of the printed circuit cards and to let the lines, formed by printed circuitry, reach the edge of the other printed circuit card in such a way that connection is established by pushing said edge into the connection member. Yet another possibility is to mount connection members on each one of the printed circuit cards and to connect the two cards either by letting the two connection members being in direct contact with each other or by inserting a small piece of a flat cable, not longer than a few decimetres, into the two connection members.

Figure 3:
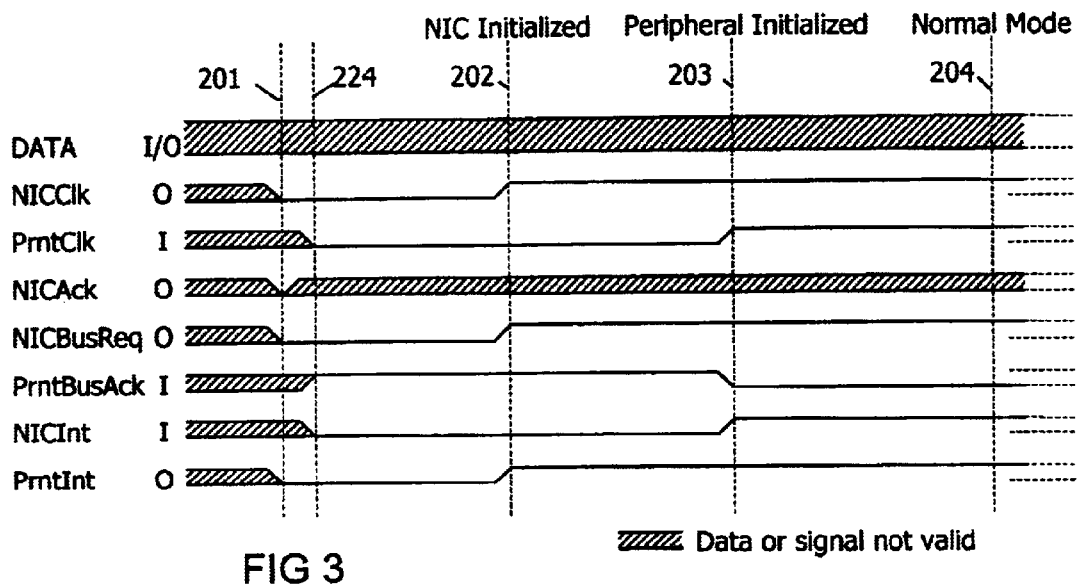
FIG. 3 is a timing diagram representing the initialisation of the interface.

Referring to FIG. 3, there is described a handshaking procedure for control of the negotiation in an initialisation phase. When the NIC is started or restarted its outputs NICClk, NICBusReq and PrntInt are set in a state according to event 201 in the handshaking diagram to indicate that it is initialising. When the peripheral device is started or restarted its outputs PrntClk, PrntBusAck and NICInt are set in a state according to event 224 in the handshaking diagram to indicate that it is initialising. The NIC output signal named NICAck does not effect the initialisation procedure, because of that the signal is not valid in this context.

Data on the data lines does not have any effect on nor is the data effected by this handshaking.

When the NIC 120 has finished its internal initialisation, it changes the state of its output lines, see event 202. The peripheral device 110 changes the state of its output lines in a similar way, see event 203, when it has finished its internal initialisation.

Which one of the NIC 120 or the peripheral device 110 changes the states of its output lines first depends on, for example, which one is the fastest or which one started the initialisation process first. Thus, the initialisation finished signalling from the NIC 120 and the peripheral device 110 could appear in reversed order, i.e. the peripheral device is initialised first and thereby changes the state of its output lines first and the NIC 120 is initialised second and thereby changes the state of its output lines later than the peripheral device.

When both the NIC 120 and the peripheral device 130 have signalled that they are initialised, the interface has reached a state where communication through that is possible; hereinafter this state is referred to as normal mode.

Figure 4:
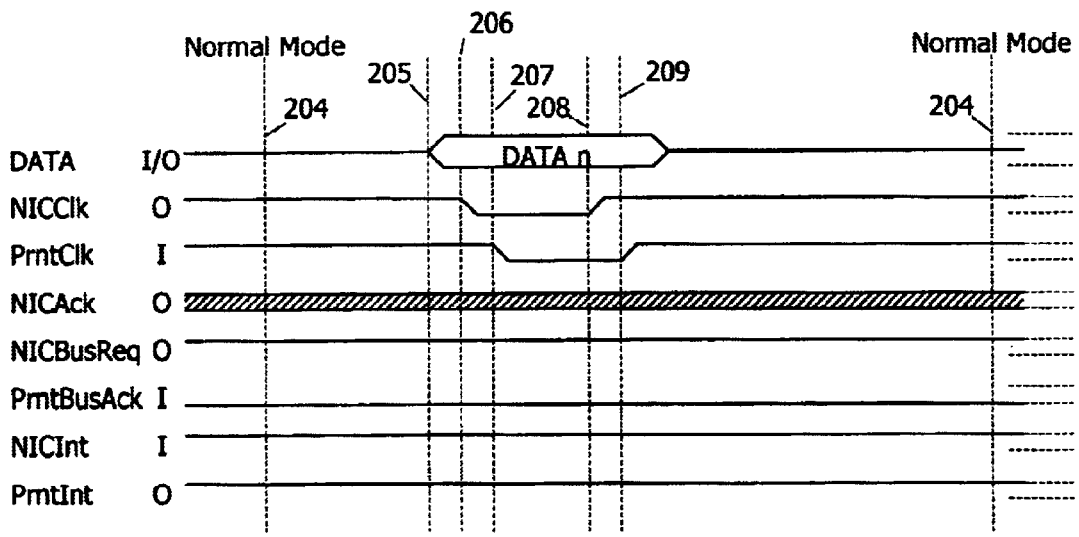
FIG. 4 is a timing diagram representing one data transmission in the forward direction.

Referring to FIG. 4, the handshaking is described, which is used during transmission of data in a direction from the NIC 120 to the peripheral device 110; this transmission direction is hereinafter referred to as forward direction.

The interface must be in the normal mode 204 to be able to begin a transmission. The transmission, in forward direction, is started by the NIC 110 making the data available 205 on the data lines 130. Then the NIC 120 sets the signal NICClk low 206. The peripheral device 110 detects this change in the NICClk state and acknowledges this by setting the signal PrntClk low 207. Then the NIC 120 sets the signal NICClk high 208, telling the peripheral device 110 that it has noticed the acknowledgement. When the peripheral device is done reading the data, it sets the signal PrntClk high 209, which simultaneously tells the NIC 120 that the peripheral device is ready to receive new data. The interface is now back in normal mode 204, which makes it possible for the NIC 110 to start a new transmission according to the above disclosed handshaking.

Figure 5:
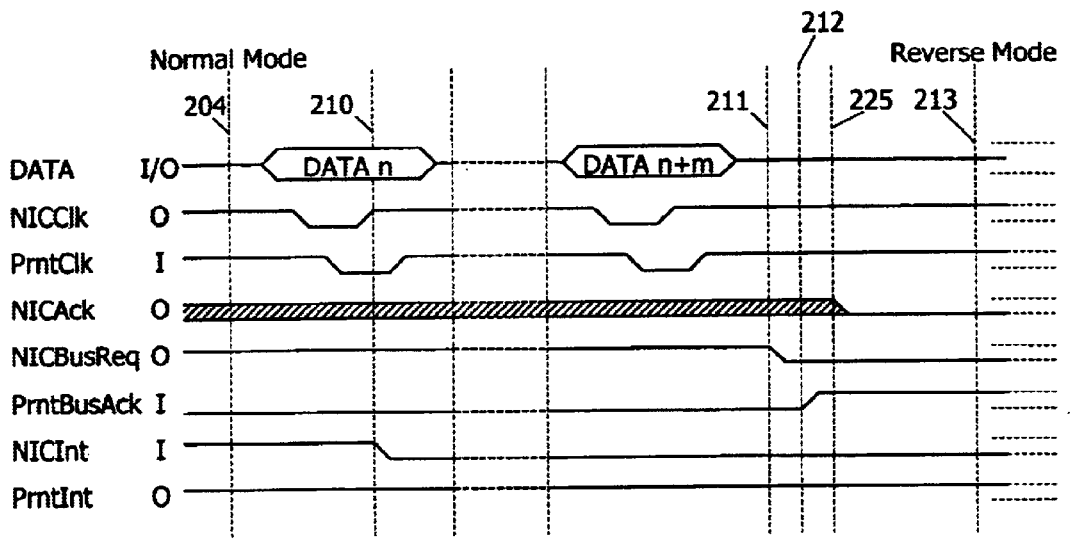
FIG. 5 is a timing diagram representing the handshaking that occurs when the interface needs to change from transmission in a forward direction to transmission in a reverse direction.

Referring to FIG. 5, the handshaking is described, which is used when the peripheral device 110 is requesting transmission of data to the NIC 120; this transmission direction is hereinafter referred to as reverse direction.

The figure displays a case where the NIC 120 is currently transmitting data to the peripheral device 110. The peripheral device 110 requests a change of transmitting direction by setting a signal NICInt low 210. If the NIC 110, as in FIG. 5, currently is transmitting data, it completes its transmission, which could comprise multiple data transactions, and then acknowledges that it is ready to receive data by setting a signal NICBusReq low 211 and simultaneously request the peripheral device to conclude the change of direction as fast as possible. If the NIC 120 is not busy transmitting data, it acknowledges immediately. Then the peripheral device 110 acknowledges that it has received the acknowledgement from the NIC 120 and simultaneously tells the NIC that it is going to transmit data in the reverse direction by setting PrntBusAck high 212. Thereafter the signal NICAck is defined as valid and is set to a low value 225. The interface is now in a state where all transmissions are made in the reverse direction, hereinafter referred to as reverse mode.

Figure 6:
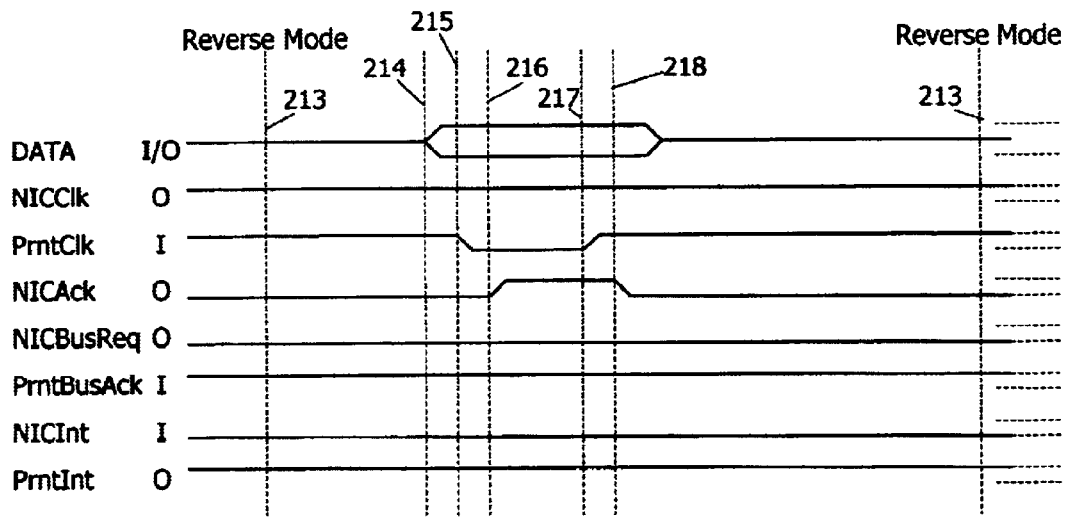
FIG. 6 is a timing diagram representing one data transmission in the reverse direction.

Referring to FIG. 6, the handshaking of a transmission in the reverse direction is described. The peripheral device 110 begins a transmission by putting the data to be transmitted on the data lines 214. When the data has stabilised on said lines, the peripheral device 110 sets the signal PrntClk low 215 to tell the NIC 120 that data is available on the data lines 130. The NIC then acknowledges that it has noticed the PrntClk signal 215 by setting the signal NICAck high 216. In response, the peripheral device 110 sets the signal PrntClk high 217 when it has noticed the NICAck signal 216. When the NIC 120 has received the data, it acknowledges by setting the signal NICAck low 218, which simultaneously informs the peripheral device 110 that the NIC 120 is ready to receive new data. Now the interface has returned to the reverse mode and consequently the peripheral device is able to transmit more data according to the handshaking above.

Figure 7:
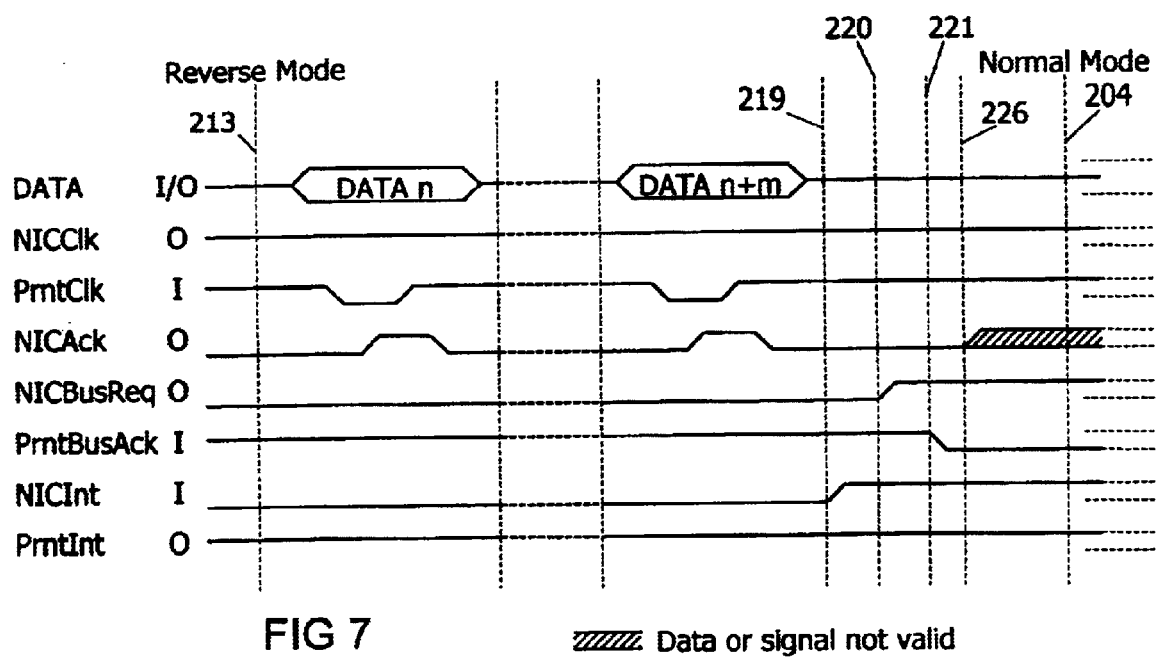
FIG. 7 is a timing diagram representing the handshaking that occurs when the interface needs to change from transmission in a reverse direction to transmission in a forward direction.

Referring to FIG. 7, when the peripheral device 110 has transmitted all data it was supposed to, the interface is to return to the normal mode. The return of the interface to the normal mode is initiated by the peripheral device setting the signal NICInt high 219 to inform the NIC 120 that it has finished its transmissions and that its intention is to return the interface to the normal mode 204. The NIC 120 acknowledges by setting the signal NICBusReq high 220 and simultaneously informs the peripheral device that it is ready to start sending in the forward direction and simultaneously request the peripheral device to put the interface in normal mode as fast as possible. The peripheral device 110 acknowledges by setting the signal PrntBusAck low 221 to tell the NIC 120 that it is ready to receive data and to return the interface to the normal mode. Thereafter the signal NICAck is not valid anymore 226.

What is claimed is:

1. An asynchronous interface for communication between a first and a second device, comprising signalling lines and at least eight data lines, characterised by
   a signal ground line, a power supply line and a power supply ground line between the two devices, and
   only seven signalling lines between the two devices,
   the seven signalling lines being
      NICClk, which provides an output from the first device for handshaking when data is transferred in a forward direction,
      PrntClk, which provides an output from the second device for handshaking when data is transferred in the forward direction and a reverse direction respectively,
      NICAck, which provides an output from the first device for handshaking when data is transferred in the reverse direction,
      NICBusReq, which provides an output from the first device for indicating that it is ready for a change in transfer direction and as a request to the second device to complete the change of transfer direction immediately,
      PrntBusAck, which provides an output from the second device for acknowledging a change of transfer direction, i.e. from forward to reverse or reverse to forward,
      NICInt, which provides an output from the second device for requesting data transfer in the reverse direction and for requesting, when the transfer in the reverse direction is finished, the interface to return to a normal mode,
      PrntInt, which provides an output from the first device for requesting the interface to be reinitialised.

2. An asynchronous interface for communication between a first and a second device according to claim 1, wherein the devices comprise signal drivers to handle the communication via the interface which are capable of sinking at most 8 mA and of sourcing at most 8 mA.

3. An asynchronous interface for communication between a first and a second device according to claim 1, wherein the connection between the first device and the second device is of a type which positions the two devices at a short distance from each other.

4. An asynchronous interface for communication between a first and a second device according to claim 3, wherein the signalling distance between the two devices is no more than a few decimetres in length.

5. An asynchronous interface for communication between a first and a second device according to claim 4, wherein each of the two devices is situated on one printed circuit card respectively, and the connection between them is formed by a connection member on one of the printed circuit cards and by letting the lines of the other printed circuit card, formed by printed circuitry, reach the edge of this card, to establish a connection when the lines of the other printed circuit card are inserted in the connection member.

6. An asynchronous interface for communication between a first and a second device according to claim 1, wherein the first device is a network interface card and the second device is a peripheral device.

7. An asynchronous interface for communication between a first and a second device according to claim 2, wherein the connection between the first device and the second device is of a type which positions the two devices at a short distance from each other.

8. An asynchronous interface for communication between a first and a second device according to claim 2, wherein the first device is a network interface card and the second device is a peripheral device.

9. An asynchronous interface for communication between a first and a second device according to claim 3, wherein the first device is a network interface card and the second device is a peripheral device.

10. An asynchronous interface for communication between a first and a second device according to claim 4, wherein the first device is a network interface card and the second device is a peripheral device.

11. An asynchronous interface for communication between a first and a second device according to claim 5, wherein the first device is a network interface card and the second device is a peripheral device.

12. A method for communication by an asynchronous interface, comprising the steps of
    the first and the second device being in a normal mode where data transmission from the first to the second device is possible, i.e. data is transmitted or the interface is waiting for data to be transmitted, and the second device intends to transmit data to the first device,
    the second device altering an output NICInt from a first state to a second state, to inform the first device that it has data to transmit and to request a change in transfer direction from a forward direction to a reverse direction,
    the first device subsequently altering an output, NICBusReq, from a first state to a second state when it has no more data to transmit, to inform the second device that it is idle and ready to receive data and to request the second device to complete the change of transfer direction,
    the second device responding to this by altering an output PrntBusAck from a first state to a second state as an acknowledgement to the output NICBusReq of the first device and to acknowledge that the change of transfer direction is completed,
    the second device subsequently making data, which it intends to send, available to the first device on data lines and sequentially to that altering an output PrntClk from a first state to a second state, to inform the first device that data is available,
    the first device altering an output NICAck from a first state to a second state, to acknowledge that it has noticed that data is available, the second device subsequently altering the output PrntClk from the second state to the first state, to acknowledge that it has noticed the change of state of the output NICAck, the first device subsequently altering the output NICAck from the first state to the second state, to acknowledge that data is received and that it is ready to receive new data, possible further data transmissions being conducted in the same manner as mentioned above until the second device has no further data to transmit, after which it alters the output NICInt from the first state to the second state, to inform the first device that it has concluded its transmission, the first device altering the output NICBusReq from the second state to the first state in response to the output NICInt of the second device, to indicate that it is prepared to operate as a transmitter and to request the second device to complete the change of transmitting direction, the second device acknowledging this by altering the output PrntBusAck from the second state to the first state, to inform the first device that it is prepared to operate as a receiver and to finally return the interface to the normal mode.

13. A method for communication by an asynchronous interface according to claim 12, further comprising the steps of the first device, when the interface is in normal mode, making the data it intends to transmit available and subsequently altering an output NICClk from a first state to a second state, to inform the second device that data is available, the second device altering the output PrntClk from a first state to a second state, to acknowledge that it has noticed that data is available, the first device subsequently altering the output NICClk from the second state to the first state, to acknowledge that it has noticed the change of state of the output PrntClk, the second device subsequently altering the PrntClk from the second state to the first state, to acknowledge that data is received and that it is ready to receive new data, possible further data transmissions being conducted in the same manner as defined above.

14. A method for communication by an asynchronous interface according to claim 12, further comprising the steps of the first device setting its outputs in the second state at initialisation and reinitialisation, the first device altering its outputs from the second state to the first state, which is the state of these outputs in normal made, when it has finished initialisation, the second device setting its outputs in the second state at initialisation and reinitialisation, the first device altering its outputs from the second state to the first state, which is the state of these outputs in normal mode, when it has finished initialisation, the interface not allowing data transmission until both the outputs of the first device and the outputs of the second device are in the first state, i.e. the interface is in normal mode.

15. A method for communication by an asynchronous interface according to claim 13, further comprising the steps of the first device setting its outputs in the second state at initialisation and reinitialisation, the first device altering its outputs from the second state to the first state, which is the state of these outputs in normal made, when it has finished initialisation, the second device setting its outputs in the second state at initialisation and reinitialisation, the first device altering its outputs from the second state to the first state, which is the state of these outputs in normal mode, when it has finished initialisation, the interface not allowing data transmission until both the outputs of the first device and the outputs of the second device are in the first state, i.e. the interface is in normal mode.

* * * * *